United States Patent [19]

Hoff et al.

[11] Patent Number: 4,794,591
[45] Date of Patent: Dec. 27, 1988

[54] DIGITAL VOICE SWITCH FOR A MULTI-PORT CONFERENCE CIRCUIT

[75] Inventors: James Hoff, Scottsdale; Arthur L. Walsh, Phoenix; John S. Young, Scottsdale, all of Ariz.

[73] Assignee: GTE Communication Systems Corporation, Phoenix, Ariz.

[21] Appl. No.: 137,904

[22] Filed: Dec. 28, 1987

[51] Int. Cl.$^4$ .............................................. H04Q 11/04
[52] U.S. Cl. ...................................... 370/62; 370/68.1
[58] Field of Search ............... 370/62, 58, 110.1, 68.1; 379/202, 201, 203, 204, 205, 206, 406, 409, 410

[56] References Cited

U.S. PATENT DOCUMENTS 4,741,025  4/1988  Maruyama et al. .................... 370/62

Primary Examiner—Robert L. Griffin
Assistant Examiner—Frank M. Scutch, III
Attorney, Agent, or Firm—Frank J. Bogacz; Anthony Miologos

[57] ABSTRACT

An echo cancellation arrangement is provided for decreasing the "singing" of a connection of a large number of telephone subscribers in a conference calling arrangement. This arrangement includes a means for inserting quiet code during time when the voice samples of incoming PCM data are zero or below a predetermined minimum threshold level. This helps decrease the amount of feedback which is amplified and output through the codec/filter to the listeners through the PCM network. An attenuation arrangement is also included which decreases the level of a summed signal of a summing node of the conference circuit. This sum signal is the combination of each of the conferees' speech. Attenuation of this signal prohibits excessive coupling of amplified feedback to each of the listening conferees.

9 Claims, 1 Drawing Sheet

DIGITAL VOICE SWITCH FOR A MULTI-PORT CONFERENCE CIRCUIT

BACKGROUND OF THE INVENTION

The present invention pertains to multi-port conference circuit arrangements and more particularly to echo suppression techniques for use with interconnecting a large number of conferees.

In modern telecommunications, large numbers of conferees may be lashed up (interconnected) to all participants (conferees) in one common telephone call. The number of conferees in one conference call may be large, approximately 20 to 25 conferees. Each of the conferees is connected to the switching network via either a line circuit or a trunk circuit. These line or trunk circuits are connected to the switching network. In a digital switching network a codec/filter converts incoming analog signals to digital signals and outgoing digital signals to analog signals.

The line and trunk circuits include hybrids. These hybrids make two wire to two wire connections in the case of line circuits and two wire to either two wire or to four wire connections in the case of trunk circuits. One of the functions of the hybrid is to balance the line impedance to the subscriber. However, since perfectly balanced hybrids are very difficult or impossible to construct, feedback occurs through a summing junction of the conference circuit.

When large numbers of conferees are interconnected, such as 10 or more, the feedback through the summing junction is added and the gain through operational amplifiers approaches unity. When this occurs, the circuit begins to sing and the conferees are not able to hear the speaker.

Accordingly, it is an object of the present invention to provide a digital voice activated switch for preventing excessive feedback through summing junctions of a conference circuit arrangement.

SUMMARY OF THE INVENTION

A digital switching system includes PCM transmit and PCM receive data streams connected to a codec/filter and the system includes a CPU controlled switching network. A digital voice switch for multi-port conference circuitry is also included.

The digital voice switch includes a summing circuit which is connected between the codec/filter and each of the conferees. The summing circuit provides a sum signal which is the combination of each of the conferees' speech. An amplifier is connected between the summing network and the codec/filter. An attenuator is connected in shunt with the amplifier and provides for variably decreasing the signal amplitude of the sum signal.

A comparator is connected to the PCM transmit and PCM receive data streams and provides an indication of the data of each PCM time slot being less than a predetermined threshold level. The CPU of the switching network indicates the identity of each particular time slot. A control circuit is connected to the comparator, to the CPU and to the attenuator. A control circuit operates to selectively enable the attenuator to decrease the amplitude of data of PCM time slots which are below the threshold level.

DESCRIPTION OF THE PREFERRED EMBODIMENT

Figure 1:
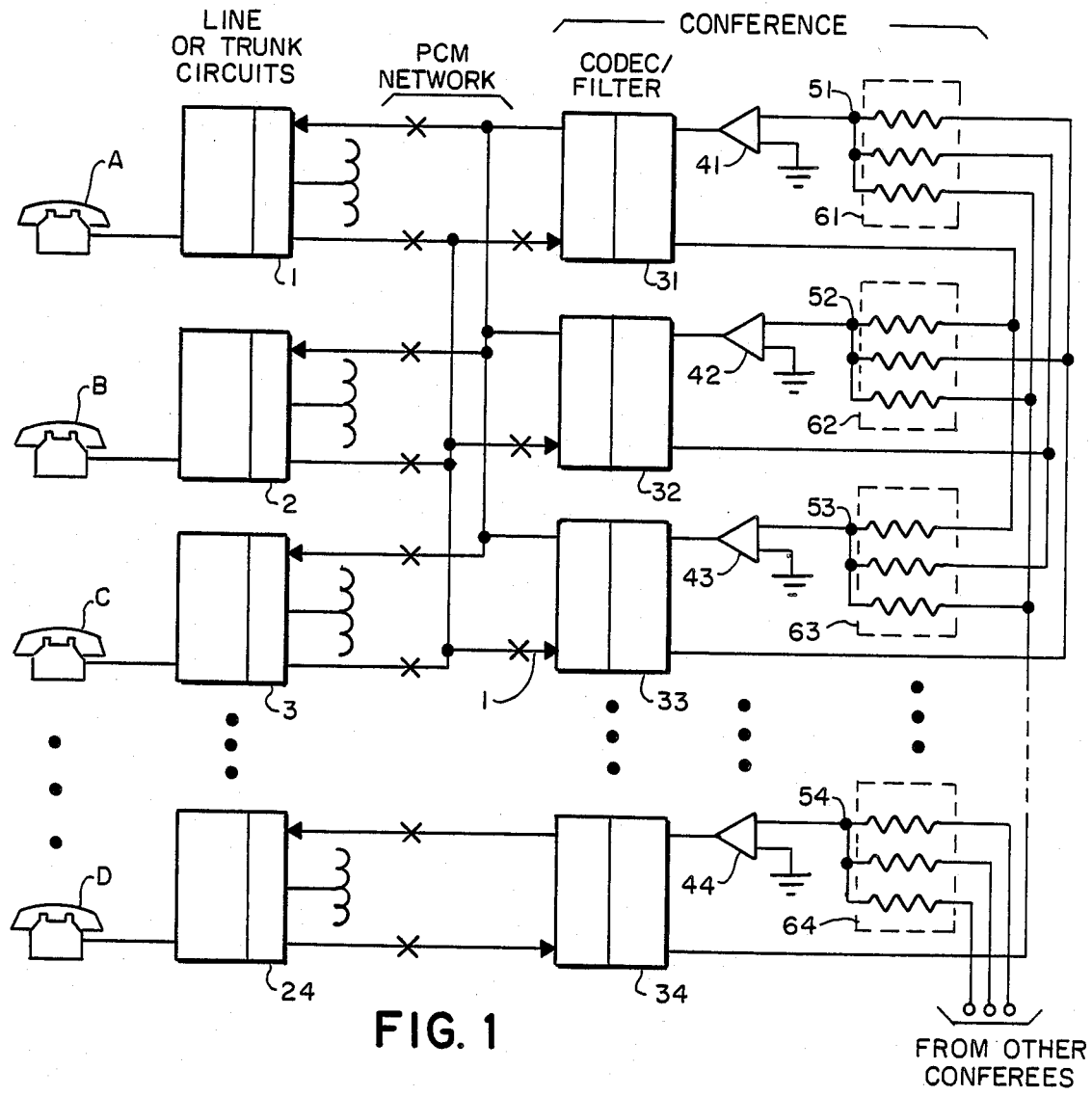
FIG. 1 is schematic diagram of the interconnections of a conference calling arrangement.

FIG. 1 depicts a conference calling arrangement. Subscriber A is connected through line circuit or trunk circuit 1, through the PCM switching network to codec/filter 31. Codec/filter 31 provides for converting analog to digital signals and digital to analog signals.

Similarly subscriber B is connected via line or trunk cicuit 2, through the PCM switching network to codec/filter 32. Subscriber C is connected via line or trunk circuit 3, through the PCM switching network to codec/filter 33. Subscriber D is connected via line or trunk circuit 24 through the PCM switching network to codec/filter 34. Although only four subscribers are shown interconnected, modern telephone conferencing arrangements provide for large numbers of telephone conferees. One such switching system, the GTD-5 EAX, manufactured by GTE Communication Systems Corporation, includes facilities for interconnecting up to 24 telephone subscribers in a conference arrangement.

Each subscriber connected in the conference receives the combination of the other speakers' voice samples. Resistor network 61 connects each of the other subscribers B, C and D to subscriber A via summing node 51 and amplifier 41. Amplifier 41 provides gain to the sum of the other three speakers' voices and transmits the summed signal through codec/filter 31, through the PCM network, through line circuit 1 to subscriber A. Similarly, resistor network 62 connects subscribers A, C and D through amplifier 41, through codec/filter 32, through the PCM network and line or trunk circuit 2 to subscriber B. Resistor network 63 connects subscribers A, B and D through amplifier 43, through codec/filter 33, through the PCM network and link or trunk circuit 3 to subscriber C. Resistor network 64 connects subscribers A, B and C through comparator 44 through codec/filter 34, through line or trunk circuit 24 to subscriber D.

Nodes 51, 52, 53 and 54 are referred to as "summing nodes". The summing node provides a signal that is the linear combination or sum of the other signals input.

As more subscribers are connected into each conference call, the number of resistors included in the summing node is increases. Since the line circuits or trunk circuits do not have perfectly balanced hybrids, some of the transmitted energy is feed back through the codec/filters into the summing node where it is amplified by the corresponding amplifier and transmitted to the listeners at a greatly increased volume. When many conferees are connected, the volume of such feed back is greatly increased and the conference approaches the "singing" point, rendering the conference unusable.

Figure 2:
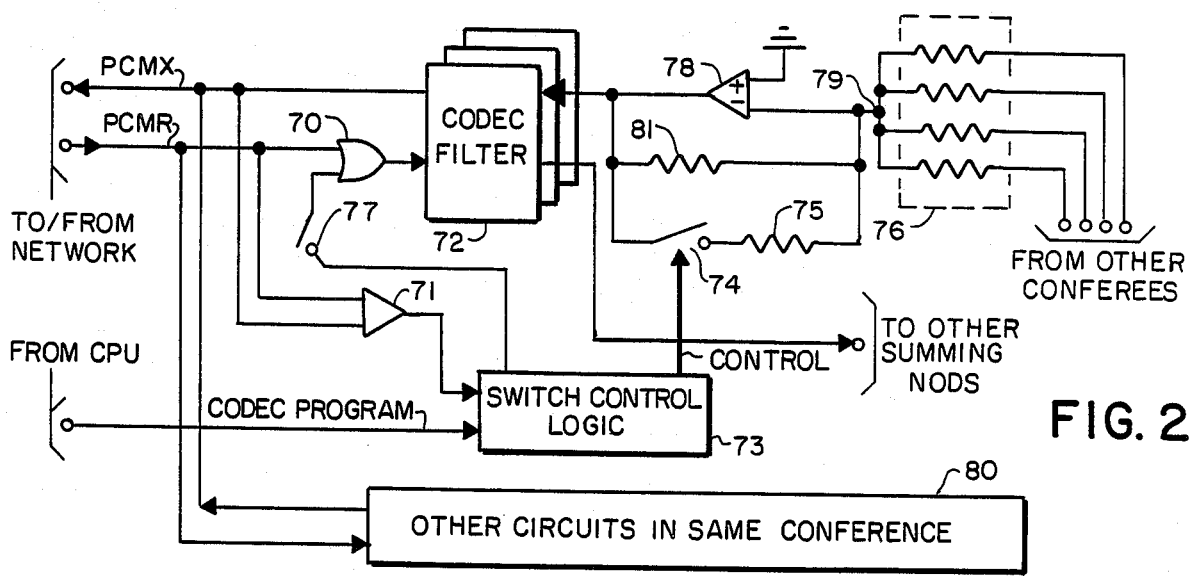
FIG. 2 is schematic diagram embodying the principals of operation of the present invention.

FIG. 2 depicts the PCM data stream transmitted to the switching network, PCMX, and from the PCM switching network, PCMR. A group of other circuits 80 connected in the same conference is shown connected to the incoming PCM stream PCMR and the out going PCM stream PCMX. PCMX and PCMR are serial data streams containing 24 time slots per frame.

OR gate 70 is connected between PCMR data stream and codec/filter 72. PCMR and PCMX data streams are also connected to digital comparator 71. A CPU which controls the switching operation of the switching system is connected to switch control logic 73 via the CODEC PROGRAM lead. Also, digital comparator 71 is connected to switch control logic 73.

Switch control logic 73 operates switch 74 via the CONTROL lead. Switch control logic 7 is also connected to switch 77. Codcc/filter 72 has connection to the other summing nodes as shown in FIG. 1.

Resistor network 76 connects the other conferees via summing node 79 to amplifier 78. Amplifier 78 is connected to the codec/filter 72 for transmitting analog data to digital data to be output on the PCM data stream to the other subscribers. Amplifier 78 has associated with it a resistor 81 connected in shunt. Connected in shunt with resistor 81 and amplifier 78 is the serial connection of switch 74 and resistor 75.

Normally switch 77 is closed. As a result, switch control logic 73 provides a stream of logic ones, if there is no speech within a particular PCM time slot or if the speech within a particular PCM time slot does not exceed a predetermined threshold level. The effect of logic ones as a PCM sample is to produce quiet code. Quiet code, as its name applies, is silence or the absence of any valid speech signals.

Next, in a PCM time slot in which there is valid speech (above a predetermined threshold level), the amount of energy transmitted from amplifier 78, through codec 72 to the PCMX data stream is attenuated. Normally, the combined signal of the other conferees' speech is summed by summing node 79. This signal is transmitted through amplifier 78 to codec 72. The signal from amplifier 78 to codec 72 is normally shunted by a connection of resistor 81. During PCM time slots in which there are valid PCM speech samples, switch control logic 73 operates switch 74 via the CONTROL lead to close switch 74. As a result, amplifier 78 is further shunted with resistance 75. The signal output from amplifier 78 to codec/filter 72 is further attenuated by resistor 75. The value of resistor 75 is selected, such that, the signal output from amplifier 78 is attenuated by 6 DB.

Switch control logic 73 operates in response to signals transmitted on the CODEC PROGRAM lead from the CPU. This signal operates switch control logic 73 to open and close switches 74 and 77 during the proper time slots. In addition, digital comparator 71 provides for detecting time slots in which valid PCM speech samples exist. Digital comparator 71 providss for this detection by comparison of the PCMX and PCMR leads with predetermined minimum threshold levels.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a digital switching system, a codec/filter is connected to PCM transmit and PCM receive data streams of a CPU controlled switching network, a digital voice switch for a multi-port conference circuit comprising:
   comparator means connected to said PCM transmit and to said PCM receive data streams, said comparator means operating in response to time slots of said PCM transmit and PCM receive data streams to provide a below threshold signal indicating one of said PCM time slots which are below a predetermined threshold value;
   control means connected to said comparator means and to said CPU, said control means operating in response to a program signal of said CPU and to said below threshold signal to provide a PCM time slot containing quiet code; and
   means for inserting connected to said control means, to said PCM receive data stream and to said codec/filter, said means for inserting receiving said PCM time slot containing quiet code from said control means and operating in response to said PCM time slot containing quiet code to replace said PCM time slots being below said threshold level with said quiet code for transmission to said codec/filter.

2. A digital voice switch as claimed in claim 1, said means for inserting including:
   switching means connected to said control means and operating in response to said control means to transmit said PCM time slot containing quiet code; and
   gating means connected to said switching means, to said PCM receive data stream and to said codec/filter, said gating means operating in response to transmit said time slot containing quiet code to said codec/filter.

3. A digital voice switch as claimed in claim 2, said gating means including OR gating means.

4. In a digital switching system, a codec/filter is connected to PCM transmit and PCM receive data streams of a CPU controlled switching network, a plurality of speaking conferees each connected to said codec/filter via a digital voice switch for a multi-port conference circuit, said digital voice switch comprising:
   summing means connected between each of said plurality of conferees and a common summing node said summing means operating to produce a sum signal being a linear combination of each said conferees' speech;
   amplification means connected between said common summing node and said codec/filter, said amplification means operating to increase an amplitude of said sum signal;
   attenuation means connected between said codec/filter and said summing means and connected in shunt with said amplification means, said attenuation means operating in response to a control signal to decrease said amplitude of said sum signal;
   comparator means connected to said PCM transmit and to said PCM receive data streams, said comparator means operating in response to data of PCM time slots of said PCM transmit and PCM receive data streams to provide an indication signal for time slots of said PCM transmit data stream being below a predetermined threshold level;
   control means connected to said comparator means, to said CPU and to said attenuation means, said control means operating in response to said indication signal and to a program signal of said CPU to produce said control signal; and
   said attenuation means operating in response to said control signal to decrease said amplitude of said sum signal.

5. A digital voice switch as claimed in claim 4, said summing means including a resistive network including a plurality of resistors, each resistor connected between said common summing node and one of said plurality of conferees.

6. A digital voice switch as claimed in claim 4, said amplification means including: amplifier unit means; and first resistor means, each connected in shunt between said common summing node and said codec/filter.

7. A digital voice switch as claimed in claim 6, said attenuation means including: second resistor means connected to said common summing node; and switching means connected to said second resistor means and to said connection of said amplifier unit means and codec/filter.

8. In a digital switching system, a codec/filter is connected to PCM transmit and PCM receive data streams of a CPU controlled switching network, a plurality of speaking conferees each connected to said codec/filter via a digital voice switch for a multi-port conference circuit, said digital voice switch comprising:

summing means connected between each of said plurality of conferees and a common summing node said summing means operating to produce a sum signal being a linear combination of each said conferees' speech;

amplification means connected between said common summing node and said codec/filter, said amplification means operating to increase an amplitude of said sum signal;

attenuation means connected between said codec/filter and said summing means and connected in shunt with said amplification means, said attenuation means operating in response to a control signal to decrease said amplitude of said sum signal;

comparator means connected to said PCM transmit and to said PCM receive data streams, said comparator means operating in response to data of PCM time slots of said PCM transmit and PCM receive data streams to provide an indication signal for time slots of said PCM transmit data stream being below a predetermined threshold level; and control means connected to said comparator means, to said CPU and to said attenuation means, said control means operating in response to said indication signal and to a program signal of said CPU to produce said control signal;

said attenuation means operating in response to said control signal to decrease said amplitude of said sum signal;

comparator means connected to said PCM transmit and to said PCM receive data streams, said comparator means operating in response to time slots of said PCM transmit and PCM receive data streams to provide a below threshold signal indicating PCM time slots which are below a predetermined threshold value;

said control means further operating in response to a program signal of said CPU and to said below threshold signal to provide a PCM time slot containing quiet code; and means for inserting connected to said control means, to said PCM receive data stream and to said codec/filter, said means for inserting operating in response to said PCM time slot containing quiet code to replace said PCM time slots being below said threshold level with said quiet code for transmission to said codec/flter.

9. A digital voice switch as claimed in claim 7, said second resistor means including a second resistor of a value such that said sum signal is attenuated by 6 DB.

* * * * *